Sept. 13, 1932.  R. OLIVER ET AL  1,877,144
BOTTLE NECK RING AND METHOD FOR MAKING THE SAME
Filed May 26, 1931   2 Sheets-Sheet 1

Ruth Oliver and George R. Penn Inventors

By C.A.Snow & Co.
Attorneys.

Sept. 13, 1932.    R. OLIVER ET AL    1,877,144
BOTTLE NECK RING AND METHOD FOR MAKING THE SAME
Filed May 26, 1931    2 Sheets-Sheet 2

Ruth Oliver and George R. Penn, Inventors

By CA Snow & Co.
Attorneys.

Patented Sept. 13, 1932

1,877,144

UNITED STATES PATENT OFFICE

RUTH OLIVER AND GEORGE R. PENN, OF NEW YORK, N. Y., ASSIGNORS, BY DIRECT AND MESNE ASSIGNMENTS, TO INCORPORATED PAPER INDUSTRIES, OF NEW YORK. N. Y., A CORPORATION OF NEW YORK

BOTTLE NECK RING AND METHOD FOR MAKING THE SAME

Application filed May 26, 1931. Serial No. 540,130.

This invention relates to a method of making tubular paper products and to neck rings and similar articles produced therefrom.

It is an object of the invention to produce a tube from paper stock supplied in web or continuous sheet form, to which a film of adhesive has been applied in a new and novel manner.

Another object is to so shape and treat the outer end of the paper sheet forming the tube as to insure a smooth inconspicuous seam upon the finished article.

A still further object is to produce from the tube a series of rings which, when combined with a paper bottle structure, will provide a strong, rigid seat for the closure disk or cap commonly employed.

With the foregoing and other objects in view which will appear as the description proceeds, the invention resides in certain novel details of construction and in certain steps in the method hereinafter more fully pointed out and claimed, it being understood that changes can be made within the scope of the claims without departing from the spirit of the invention.

In the accompanying drawings the produced articles and the steps in the method of forming them have been disclosed.

Referring to the figures by characters of reference, 1 designates a roll of paper stock from which a paper web 2 extends over a tube 3 having a longitudinal slot 4 along its line of contact with the web. This tube is kept supplied with a fluid adhesive, preferably heated, which will be distributed in a thin, even film over the entire area of the bottom surface of the web as it slides over the pipe or adhesive applicator 3.

Figure 1:
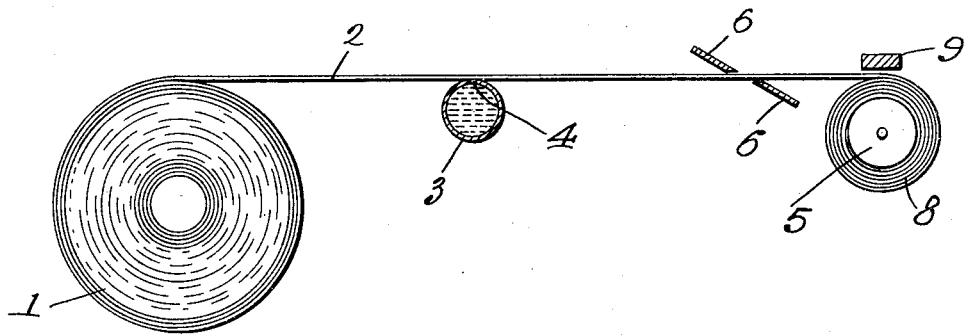
Figure 1 is a view showing in diagram, the apparatus used in the formation of a tube from sheet paper stock.
Figure 2:
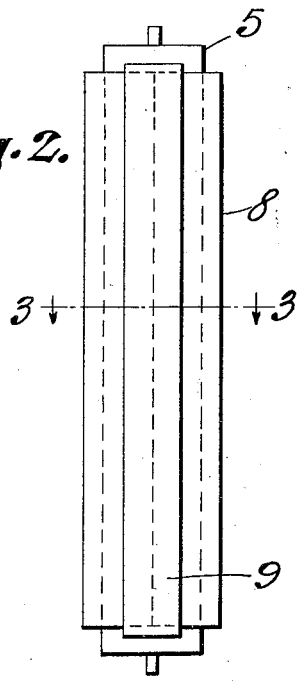
Figure 2 is a plan view of the tube on its mandrel and beneath its pressure applying means.
Figure 4:
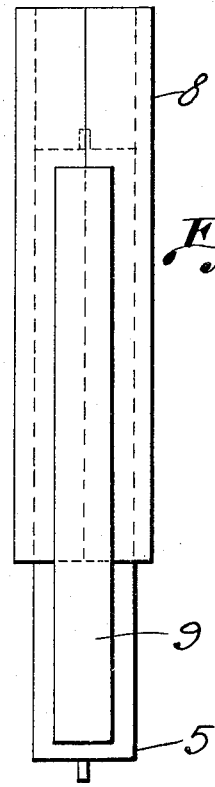
Figure 4 is a view like Figure 2 showing the tube partly ejected while subjected to pressure.
Figure 3:
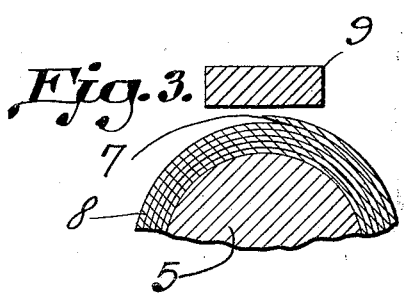
Figure 3 is an enlarged section showing a portion of the tube and its pressure means prior to the application of pressure, said figure being a partial section on line 3—3, Figure 2.
Figure 5:
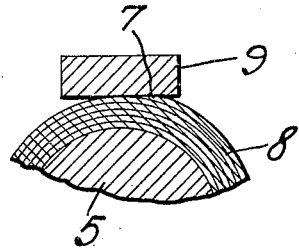
Figure 5 is an enlarged view like Figure 3 showing the pressure means on the tube during the ejection of the tube.
Figure 7:
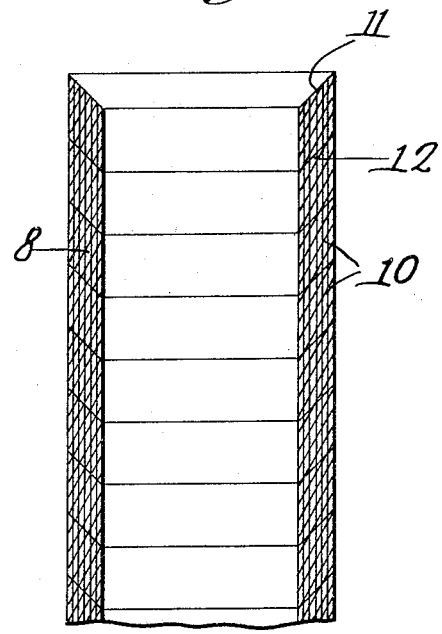
Figure 7 is a section on line 7—7, Figure 6.
Figure 6:
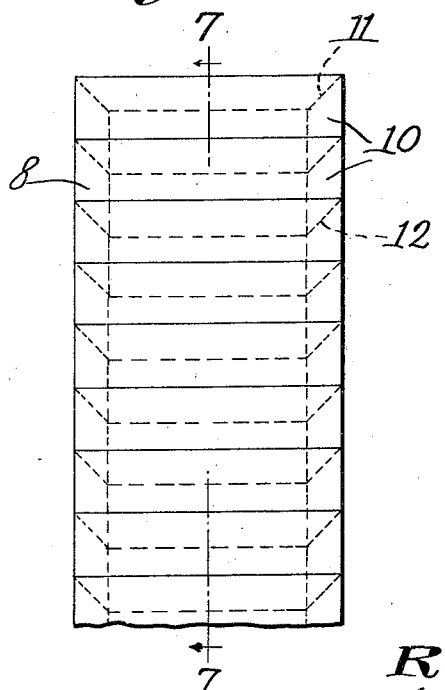
Figure 6 is a plan view of a portion of the tube cut into a series of rings.
Figure 8:
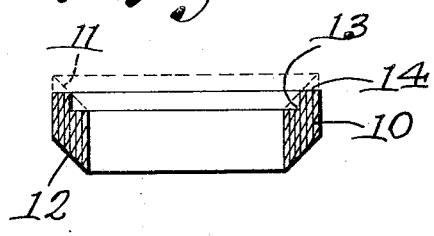
Figure 8 is an enlarged section through one of the rings showing, by broken lines, its initial shape and, by full lines, its final contour.

The front or advancing end of the web 2 is held in any desired manner to a rotatable cylindrical mandrel 5 and between this mandrel and the applicator 3 are cooperating cutting elements 6 adapted to sever the web along a straight transverse line so as to produce a taper or bevel terminating in a thin edge as shown, for example, at 7 in Figure 3. This severing action does not take place until after a sufficient number of wraps have been made about the mandrel 5 to produce a paper tube 8 of the desired size and thickness.

Following the action described the tapered edge 7 of the web is brought to position beneath a pressure element 9, which can consist of a heavy plate or other suitable device adapted to rest firmly on the said edge and press it down upon the surface of the tube, so as to adhere properly. While the tube is thus held under pressure it is forced longitudinally from under the element 9 which will act to exert a wiping and smoothing action upon the seam.

The tube produced as described can be used advantageously for various purposes and as it is not wrapped spirally, as is the common practice, it will be better able to withstand longitudinal crushing forces without danger of spreading and coming apart. In view of the foregoing characteristic the tube is especially suited for the production of paper neck rings to be used in the formation of paper bottles whereby such bottles, whether they be of angular or other configuration, can be finished with a circular neck ring providing a seat for the usual closure disk or cap.

In producing the neck rings the tube is divided by tapered annular cuts into separate rings 10 all of the same size and proportions and each provided in one end with a conical seat 11 and at its other end with a correspondingly tapered surface 12. Each of the rings thus produced is placed between shaping dies for engaging the faces 11 and 12 and these dies are adapted to compress the ring axially so that there will be produced a squared annular shoulder 13 and a suitably shaped edge portion 14, the shoulder forming a seat for engagement by the usual closure disk or cap.

The neck rings can be produced rapidly and with well finished surfaces and will not only provide an efficient cap holder but will also add materially to the strength of the container with which it is used.

As the neck rings are formed of sheet material wrapped as already explained they will not tear apart during the final shaping action because the texture of each convolution will extend without break the full length of the ring.

What is claimed is:

1. The hereindescribed method of producing a tubular paper product which includes the step of drawing a sheet of paper stock over an adhesive applying element, winding the sheet into a tube the length of which is equal to the width of the sheet of paper stock, severing the sheet along a straight transverse line to produce a beveled edge, and applying pressure to said edge to flatten it upon the formed tubular product.

2. The hereindescribed method of producing a tubular paper product which includes the step of drawing a sheet of paper stock over an adhesive applying element, winding the sheet into a tube the length of which is equal to the width of the sheet of paper stock, severing the sheet along a straight transverse line to produce a beveled edge, applying pressure to said edge to flatten it upon the formed tubular product, and subsequently sliding the tubular product axially while subjected to pressure thereby to produce a wiping action along the pressed edge and free the said product from the pressure means.

3. The hereindescribed method of producing a tubular paper product which includes the step of drawing a sheet of paper stock over an adhesive applying element, winding the sheet into a tube the length of which is equal to the width of the sheet of paper stock, and severing the tube by means of annular conical cuts into separate rings.

4. The hereindescribed method of producing a tubular paper product which includes the step of drawing a sheet of paper stock over an adhesive applying element, winding the sheet into a tube the length of which is equal to the width of the sheet of paper stock, severing the tube by means of annular conical cuts into separate rings each having a conical recess in one end, and finally subjecting each ring to pressure from shaping dies to reform the conical recess into a recess having an interior annular seat.

5. The method of producing a tubular product which includes the step of wrapping into tubular form a sheet of paper stock having a film of adhesive covering one surface, all of the convolutions of the tube being continuous and unbroken from end to end, and finally subjecting the tube to compression axially thereof to produce a recess in one end having an annular seat.

6. The method of producing a tubular product which includes the step of wrapping into tubular form a sheet of paper stock having a film of adhesive covering one surface, all of the convolutions of the tube being continuous and unbroken from end to end, subsequently producing annular tapered cuts in the tube to divide it into a series of rings each having a conical recess in one end and a conical projecting portion at its other end, and finally subjecting each ring to axial pressure to reshape the conical recess into a recess having a flat annular seat.

In testimony that we claim the foregoing as our own, we have hereto affixed our signatures.

RUTH OLIVER.
GEORGE R. PENN.